Patented Apr. 24, 1923.

1,452,881

UNITED STATES PATENT OFFICE.

LELAND J. LEWIS, OF NEW YORK, N. Y., ASSIGNOR OF ONE-HALF TO RALPH H. McKEE, OF NEW YORK, N. Y.

FAT-SPLITTING REAGENT AND METHOD OF MAKING THE SAME.

No Drawing.    Application filed April 14, 1921.    Serial No. 461,387.

*To all whom it may concern:*

Be it known that I, LELAND J. LEWIS, a citizen of the United States, residing at New York, in the county of New York and State of New York, have invented certain new and useful Improvements in Fat-Splitting Reagents and Methods of Making the Same, of which the following is a specification.

This invention relates to the production of a reagent for hydrolyzing oils and fats, and more particularly to the production of cymenestearosulfonic acid.

The use of sulfonic acids as a fat splitting reagent has heretofore been proposed, and compounds of benzene, oleic acid, and sulfuric acid have been employed for this purpose. The benzenestearosulfonic acid is prepared and purified, and is then placed in the oil or fat to be treated in proper proportion in admixture with water, and heated to separate the fatty acids and glycerine. In place of benzene, other light hydrocarbons such as naphthalene have been employed, and the material that is obtained commercially from the sludge acids left in the refining of petroleums is also used.

I have found that more satisfactory results may be obtained if a sulfonic acid of cymene (methyl-isopropyl-benzene) is employed in place of the reagent referred to above. Cymene is no more expensive to obtain than benzene or naphthalene, and the reagent is prepared in the same manner. It has the advantage of carrying over little suspended carbon, which serves to darken the fatty acid formed in practicing the process, and the hydrolysis takes place more rapidly. A better grade of fatty acid is obtained in that it is of much lighter color when produced according to my process than the acid obtained from treating oils and fats with the reagents heretofore known.

In the production of the reagent, cymene, oleic acid, and sulfuric acid are mixed and stirred or agitated, and reaction will take place at ordinary temperature, but it may be materially hastened by heating to a temperature of substantially 100° C. After the sulfonation is complete, the resulting product is diluted with water, boiled a few minutes, and the oily layer separated by decanting. The cymenestearosulfonic acid, sufficiently pure for commercial use, is obtained. If a pure product is desired, the material may be purified by washing with dilute hydrochloric acid, extracting with gasoline, and drying the residual product. This material is employed in the usual manner by placing a small percentage thereof into an open tank of melted fat or oil. An amount of water substantially equal to the weight of the fat or oil is added and the mixture heated and stirred. The glycerine is then drawn off from the bottom of the tank.

In a typical embodiment of the invention, 10 parts of cymene, 19 parts of oleic acid, and about 60 parts of 66° sulfuric acid are mixed and stirred. Sulfonation will take place at ordinary temperature, but quicker results may be obtained by heating to a temperature of substantially 100° C. At ordinary temperature, a period of about twenty-four hours will be necessary for the complete sulfonation, but at the higher temperature, a period of from three to five hours will suffice. The product obtained is diluted with water and boiled for a few minutes, and the oily layer is decanted, producing cymenestearosulfonic acid of sufficient purity for commercial use. Where a purer product is desired, purification may be obtained by washing with dilute hydrochloric acid, extracting with gasoline and drying the residual product on a boiling water bath.

The product is used in the following manner: From ½ to 1 per cent of the cymenestearosulfonic acid is added to a body of melted fat or oil in an open tank, the percentage being based on the weight of the oil or fat to be hydrolyzed. When ½ per cent of the reagent is used, 1 per cent of sulfuric acid is also added. An amount of water approximately equal in weight to the weight of the oil or fat treated is then added, and the whole thoroughly mixed either by a mechanical stirrer, steam jets, or other suitable means. The material is then heated in the usual manner, the heating and stirring depending upon the amount of acid used, and the type of fat which is being hydrolyzed. After the treatment has been completed, the glycerine is drawn off from the bottom of the tank. In plant practice, it is customary to add an additional amount of the reagent to the treated fat or oil together with water and reboil the residual mixture of fat and fatty acid to complete the extraction of the fatty acids. The resulting fatty acids are separated from the glycerine water and are ready for commercial use. The glycerine waters are steam distilled, or otherwise treated to recover the glycerine therefrom.

The following examples will serve to show the advantages to be obtained from the use of the present reagent:

(1). To 100 parts of cottonseed oil, there was added 100 parts of water and 1 part of cymenestearosulfonic acid. The mixture was heated for ten hours, and gave 48 per cent hydrolysis, whereas a parallel experiment using the customary reagents generally employed in the art, gave 4, 5 and 15 per cent respectively.

(2). In another experiment, 100 parts of cocoanut oil, 100 parts of water, 1 part of sulfuric acid, and 1 part of cymenestearosulfonic acid gave 64 per cent hydrolysis in five hours. A similar experiment with the most effective of the known reagents used at the present time gave but 55 per cent hydrolysis in the same period of time. It will be noted that both reagents are speeded up by the introduction of sulfuric acid, but that the cymene reagent has an advantage over the known commercial reagents whether employed separately or in conjunction with sulfuric acid.

(3). A similar experiment with soap grade tallow, in which 100 parts of tallow, 100 parts of water, 1 part of sulfuric acid, and ½ part of cymenestearosulfonic acid gave 48.5 per cent hydrolysis, whereas a similar experiment with the most effective of the known reagents under the same conditions, gave 38 per cent hydrolysis.

The color of the fatty acids made from commercial fats by the use of the new reagent is less than one-half the color present in the fatty acids obtained under similar conditions from the same fats by the use of hydrolyzing agents previously used in the art. The gylcerine obtained is similarly less colored, and hence, of better quality than that obtained at present.

In the treatment of the reagent, other materials may be employed in place of oleic acid, I have found that rosin or the acids from hydrogenized castor oil may be employed, but that slightly better results are obtained when oleic acid is used. Similarly, cymenesulfonic acid may be employed in place of cymenestearosulfonic acid, but not as satisfactory results are obtained. In the manufacture of cymenesulfonic acid, an equal quantity of cymene and 66° sulfuric acid are mixed at temperatures around 100° C.

The reagent herein described may be produced in less time and more cheaply than similar reagents employing benzene or naphthalene, and has the advantage of producing more complete and better hydrolysis of the fats or oils.

While I have described in detail the preferred practice of my process, it is to be understood that the details of proceedure, and proportion of ingredients may be widely varied, and that known chemical equivalents may be employed in place of the materials mentioned, without departing from the spirit of the invention or the scope of the subjoined claims.

Having thus described my invention, I claim:

1. Cymenestearosulfonic acid.
2. The method of producing a fat splitting reagent which comprises sulfonating cymene and oleic acid.
3. The method of producing a fat splitting reagent which comprises heating a mixture of sulfuric acid, cymene, and oleic acid.

In testimony whereof I affix my signature in presence of two witnesses.

LELAND J. LEWIS.

Witnesses:
GEORGE BARSKY,
L. V. EATON.